(12) United States Patent
Chi et al.

(10) Patent No.: US 7,366,385 B2
(45) Date of Patent: Apr. 29, 2008

(54) TUNABLE FIBER AMPLIFIER AND LASER

(75) Inventors: Sien Chi, Hsinchu (TW); Nan-Kuang Chen, Xinzhuang (TW)

(73) Assignee: National Chiao Tung University, Hsinchu (TW)

( * ) Notice: Subject to any disclaimer, the term of this patent is extended or adjusted under 35 U.S.C. 154(b) by 0 days.

(21) Appl. No.: 11/223,691

(22) Filed: Sep. 12, 2005

(65) Prior Publication Data
US 2007/0058914 A1   Mar. 15, 2007

(30) Foreign Application Priority Data
May 27, 2005   (TW) ............................... 94117445 A

(51) Int. Cl.
*G02B 6/02*   (2006.01)
(52) U.S. Cl. ..................................... 385/123
(58) Field of Classification Search ........ 385/123–124, 385/127–128, 129–132; 372/6; 359/341.1, 359/341.3, 341.5
See application file for complete search history.

(56) References Cited

U.S. PATENT DOCUMENTS

| 6,240,226 | B1 * | 5/2001 | Presby et al. | 385/42 |
| 6,243,517 | B1 * | 6/2001 | Deacon | 385/50 |
| 6,310,999 | B1 * | 10/2001 | Marcuse et al. | 385/42 |
| 6,324,204 | B1 * | 11/2001 | Deacon | 372/96 |
| 6,643,429 | B2 * | 11/2003 | Robinson et al. | 385/37 |
| 6,934,313 | B1 * | 8/2005 | Deacon | 372/64 |
| 7,079,747 | B1 * | 7/2006 | Gagnon et al. | 385/140 |
| 2003/0067945 | A1 * | 4/2003 | Gao et al. | 372/7 |

* cited by examiner

*Primary Examiner*—Quyen P Leung
(74) *Attorney, Agent, or Firm*—Troxell Law Office PLLC

(57) ABSTRACT

The present invention has a core and at least one cladding, where, by changing the temperature of the cladding, the material dispersion characteristic of the cladding is changed and a refractive index is varied to make fundamental-mode cutoff tunable as well; and the difference between dispersion slopes of core and cladding is crucial to the sharpness of the fundamental-mode cutoff.

23 Claims, 21 Drawing Sheets

TUNABLE FIBER AMPLIFIER AND LASER

FIELD OF THE INVENTION

The present invention relates to a fiber; more particularly, relates to changing a refractive index of a cladding to obtain a tunable amplifier and laser based on a material dispersion discrepancy between a core and a cladding, which can be applied in a wavelength-selective optical signal amplification.

DESCRIPTION OF THE RELATED ART

Fiber is one of the most popular transmission mediums now. A fiber with double cladding structure can obtain a fundamental-mode cutoff by properly designed waveguide dispersions, where a filter is simultaneously obtained for filtering off long wavelength while keeping short wavelength guided. Yet, the filtering is not tunable without bending the fiber.

Please refer to FIG. 13, which is a view showing a distribution of a refractive index for a double-cladding fiber of a prior art having a fundamental-mode cutoff wavelength. As shown in the figure, an article written by Mark A. Arbore, titled "Application of fundamental-mode cutoff for novel amplifiers and lasers," Optical Fiber Communication conference (OFC 2005) March 6~11, Anaheim, 2005, describes that, through controlling a physical waveguide structure having waveguide dispersion, the effective index for short wavelength 90, the effective index for long wavelength 100, and the inner cladding thickness 110 are explored by controlling the thickness and refractive indices of the core and inner cladding of a fiber to obtain a fundamental-mode cutoff. Hence, by controlling the waveguide structure, wavelength can be filtered to filter off long wavelength while keeping short wavelength guided so that the optical amplification can be shifted from a long wavelength toward a short wavelength and, so, an S-band (1480~1520 nm) Er-doped fiber amplifier can be obtained. However, it is very difficult for this kind of fiber amplifier to dynamically tune the gain bandwidth for optical amplification, where fundamental-mode cutoff wavelength can only be tuned by mechanically bending the fiber. As a result, the filtering efficiency is not good; and it is not easy for tuning the gain bandwidth for optical amplification so as to obtain tunable fiber amplifiers and lasers. So, the prior art does not fulfill users' requests on actual use.

SUMMARY OF THE INVENTION

Therefore, the main purpose of the present invention is to obtain a fundamental-mode cutoff based on the material dispersion discrepancy between a core and a cladding and to further make the fundamental-mode cutoff wavelength tunable.

To achieve the above purpose, the present invention is a tunable fiber amplifier and laser, comprising a core and at least one cladding, where the core is an optical gain medium for an electrical pumping or an optical pumping; the cladding is an optical dispersive material surrounding the core; a fundamental-mode cutoff is obtained based on the material dispersion discrepancy of the core and the cladding; and, by changing the temperature of the dispersive material in cladding, the refractive index dispersion of the cladding is changed and, accordingly, a novel tunable fiber amplifier and laser is obtained.

BRIEF DESCRIPTIONS OF THE DRAWINGS

The present invention will be better understood from the following detailed descriptions of the preferred embodiments according to the present invention, taken in conjunction with the accompanying drawings, in which FIG. 1 is a cross-sectional view of a first preferred embodiment according to the present invention;

DESCRIPTION OF THE PREFERRED EMBODIMENTS

The following descriptions of the preferred embodiments are provided to understand the features and the structures of the present invention.

Figure 1:
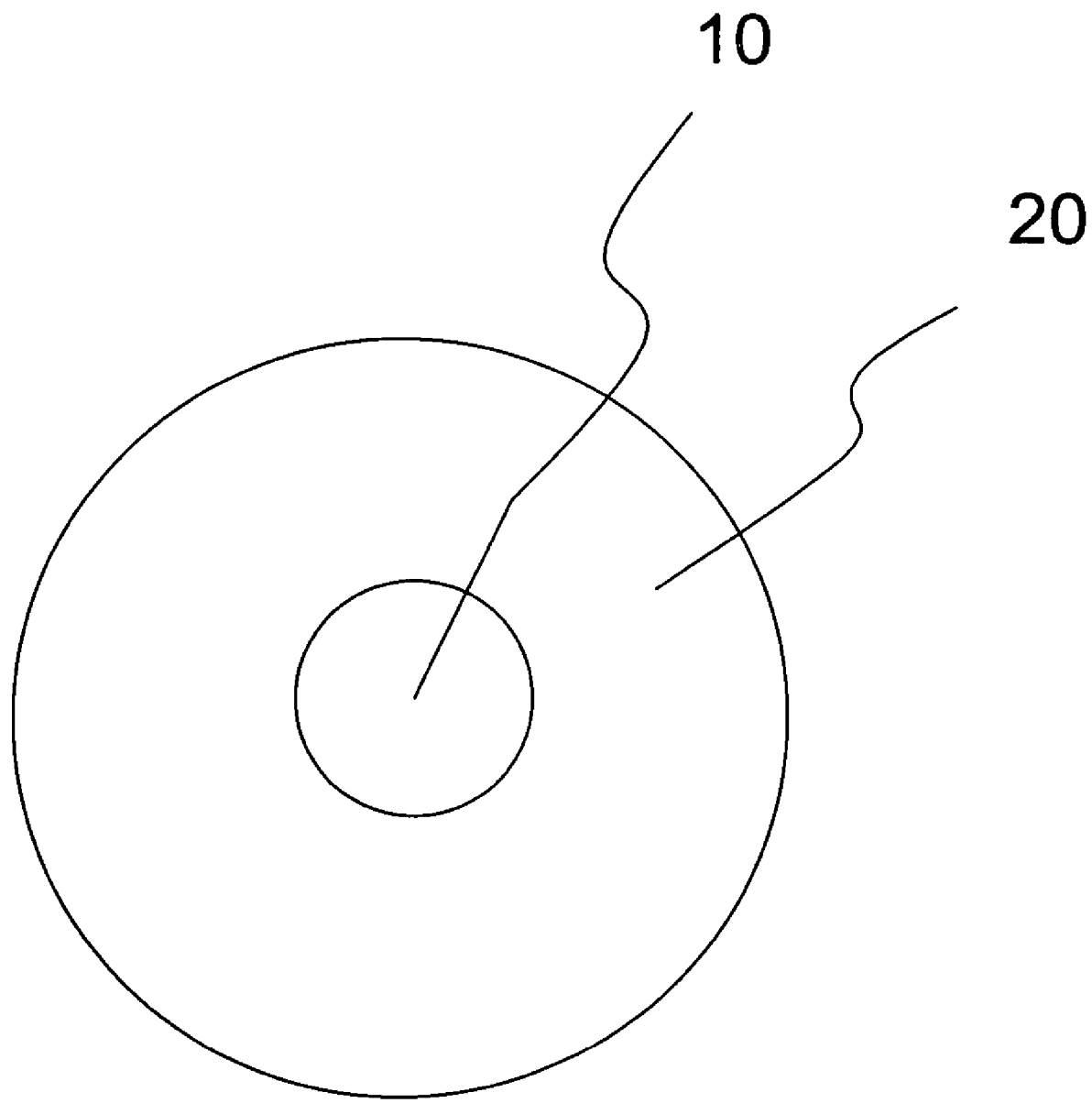
Figure 2A:
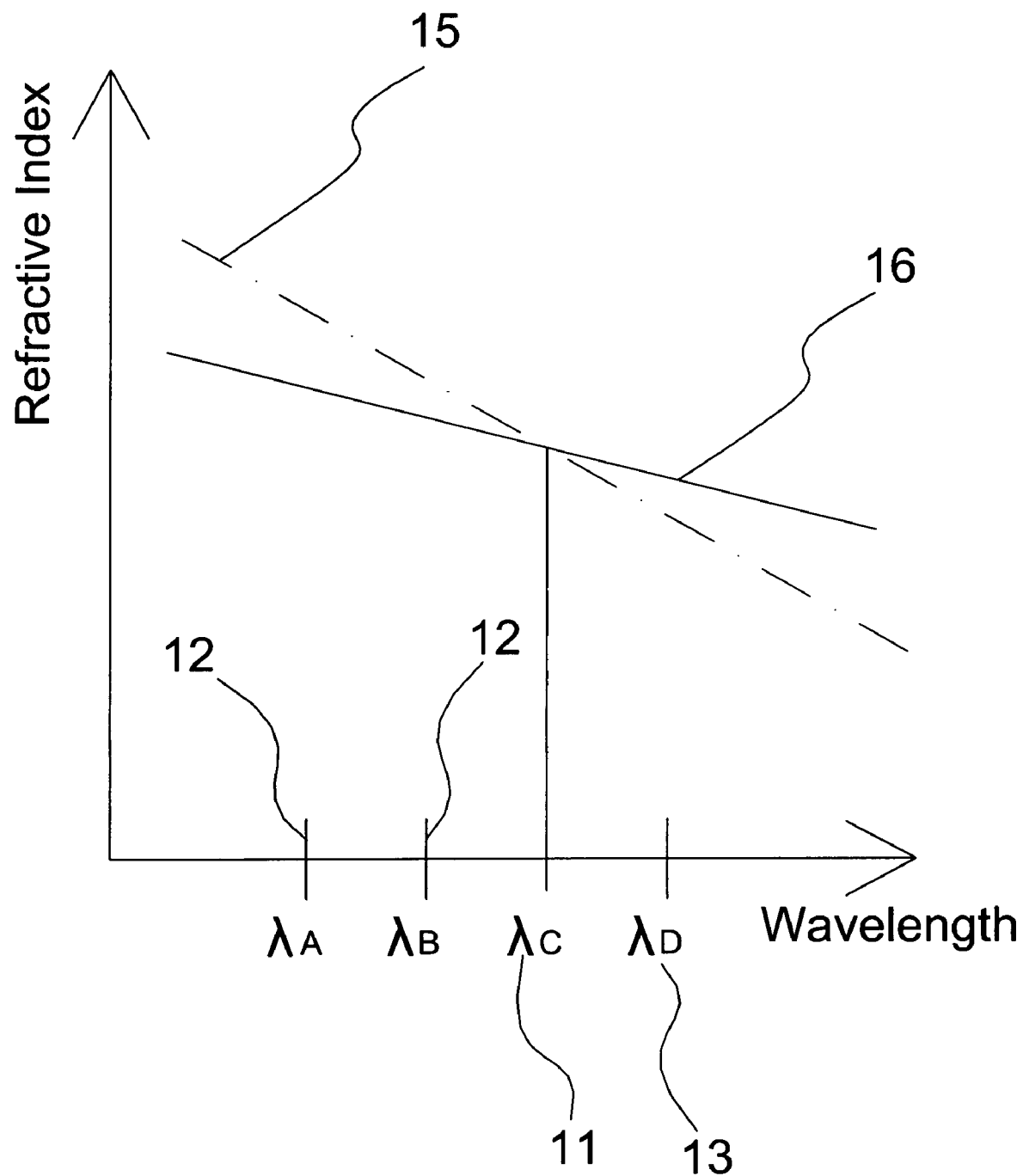
FIG. 2A is a first schematic view showing a relationship between refractive index and wavelength according to the first preferred embodiment of the present invention.
Figure 2B:
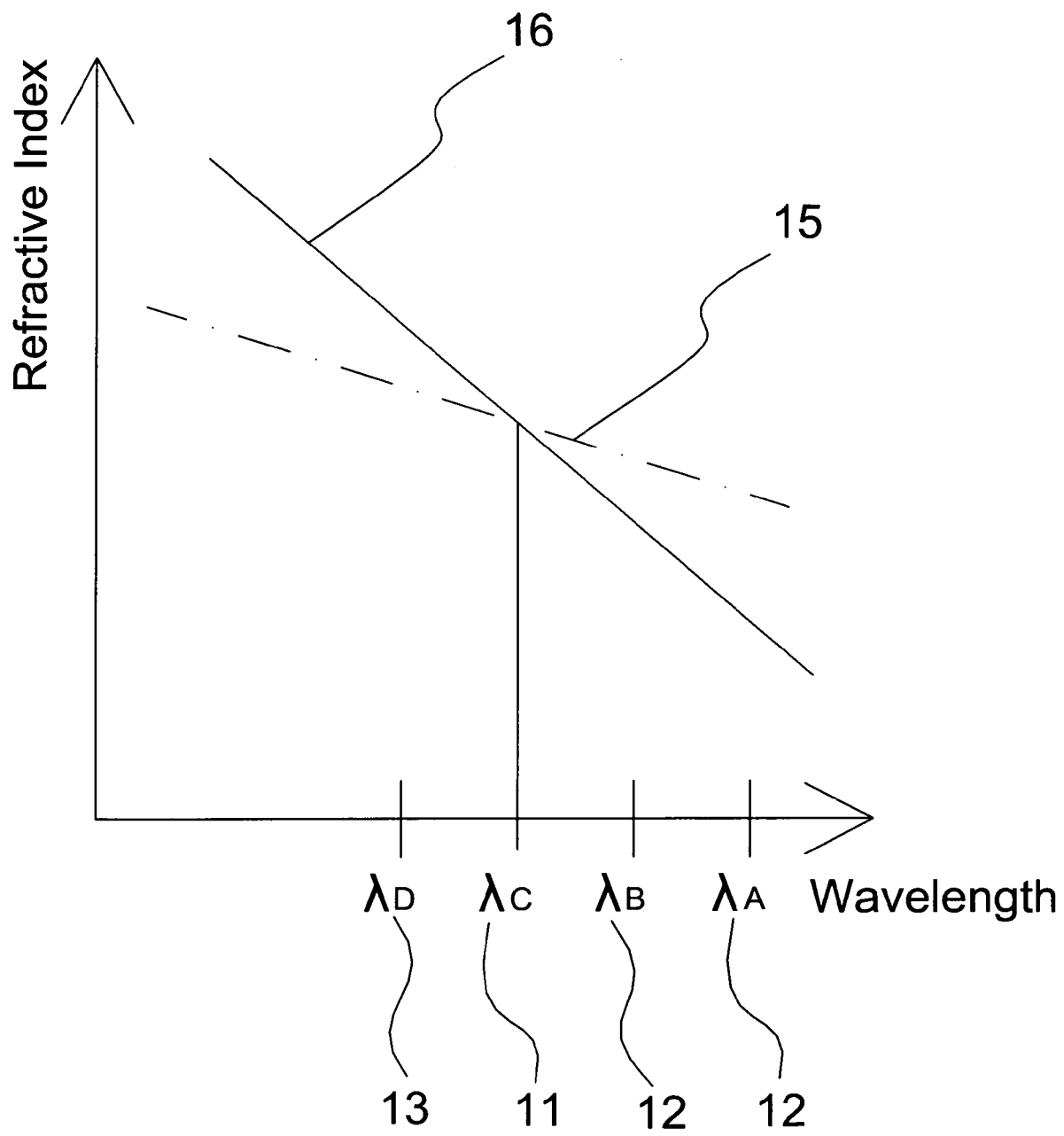
FIG. 2B is a second schematic view showing the relationship between refractive index and wavelength according to the first preferred embodiment of the present invention.
Figure 2C:
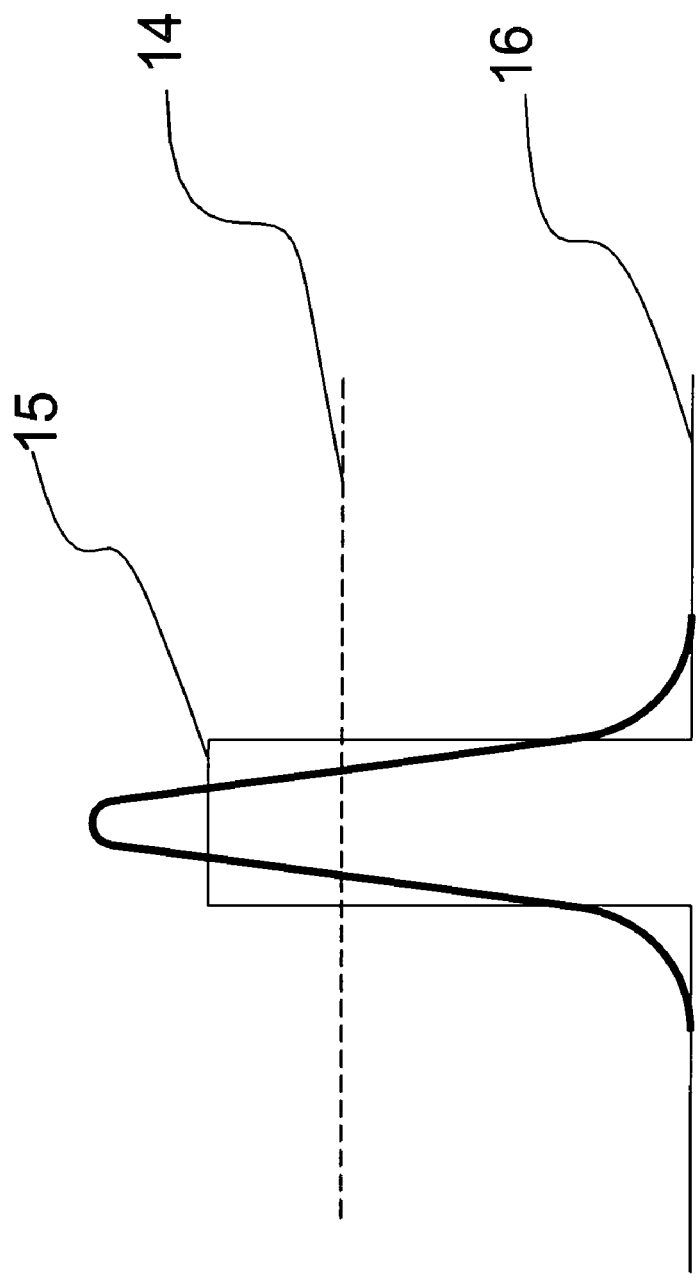
FIG. 2C is a schematic view showing a $\lambda_A$ mode field distribution of the first preferred embodiment according to the present invention.
Figure 2D:
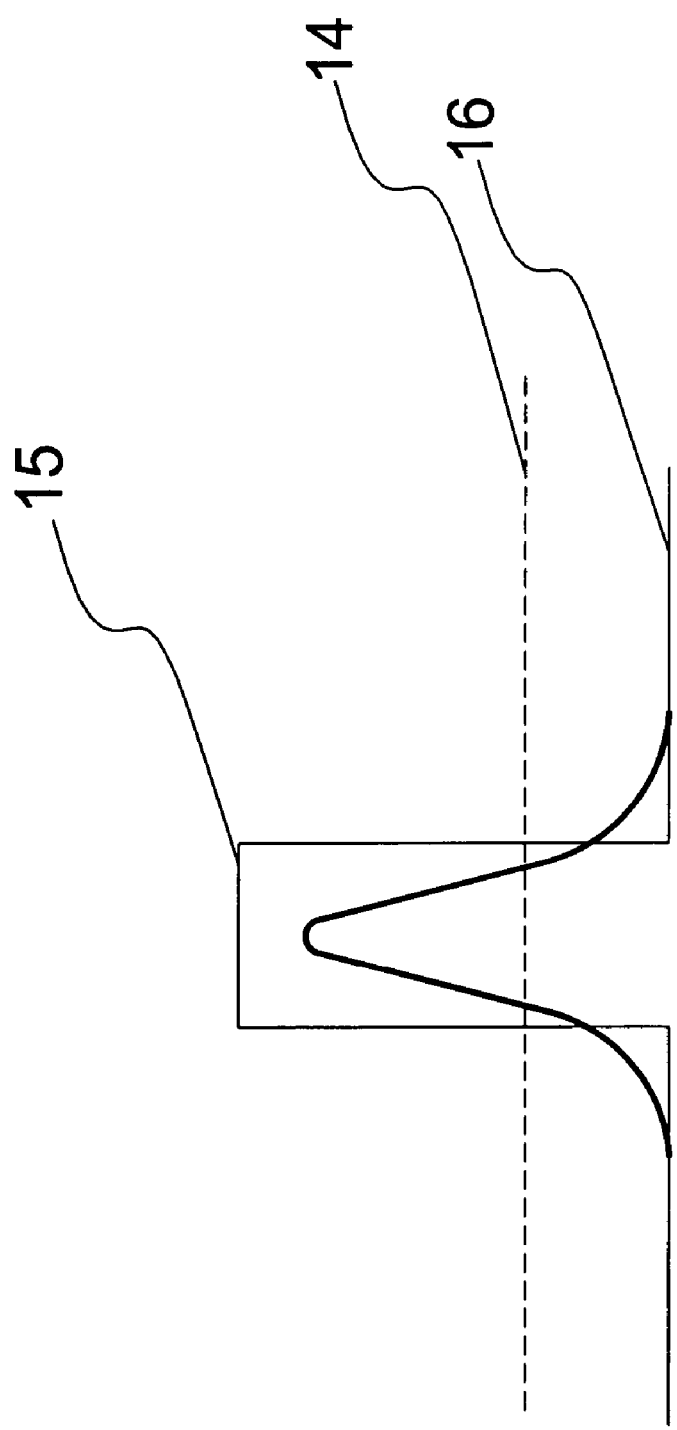
FIG. 2D is a schematic view showing a $\lambda_B$ mode field distribution of the first preferred embodiment according to the present invention.
Figure 2E:
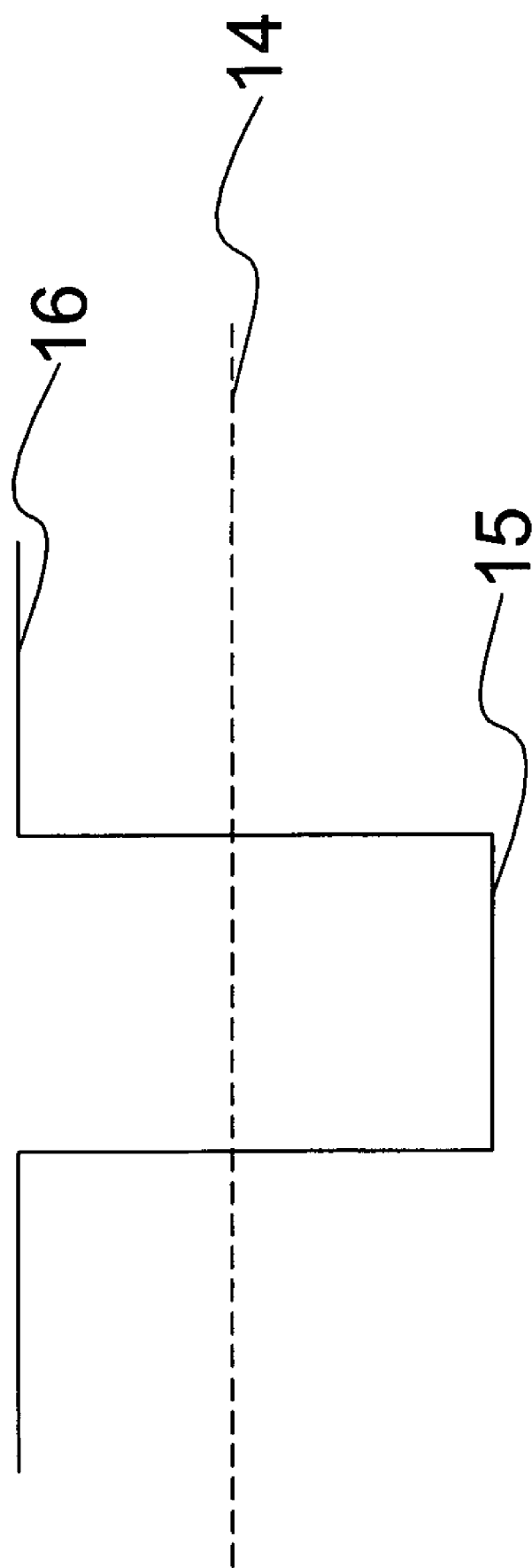
FIG. 2E is a schematic view showing a $\lambda_D$ mode field distribution of the first preferred embodiment according to the present invention.

Please refer to FIG. 1, which is a cross-sectional view of a first preferred embodiment according to the present invention. As shown in the figure, the present invention is a tunable fiber amplifier and laser, made of a fiber comprising a core 10 and a cladding 20, where the core 10 is surrounded with the cladding 20; the core 10 is an optical gain medium for an electronic pumping or an optical pumping; and, the cladding 20 is made of an optical dispersive material of a polymer (which can be a conductive polymer), an optical absorbing material, an optical birefringent material, an optical non-linear material, a bio-material or a metal.

Please refer to FIG. 2A through FIG. 2E, which are a first and a second schematic views showing a relationship between refractive index and wavelength and schematic views showing mode field distributions, according to the first preferred embodiment of the present invention. As shown in the figures, when the refractive-index dispersion curve of the core 10 and that of the cladding 20 are different and so their dispersion slopes are different, the two refractive-index dispersion curves will intersect at an intersecting point 11 ($\lambda_c$) for a demarcation into $\lambda_A$, $\lambda_B$ and $\lambda_D$. The $\lambda_A$ and the $\lambda_B$ are in a so-called wave-guiding mode 12, where the refractive index 15 of the core 10 is higher than the refractive index 16 of the cladding 20; and, it shows waveguiding can only be done when the effective refractive index (neff) 14 is higher than the refractive index 16 of the cladding. The $\lambda_D$ is in a so-called wave-leaking mode 13, where its effective refractive index 14 is smaller than the refractive index 16 of the cladding 20 and no transmission can be done.

Figure 3:
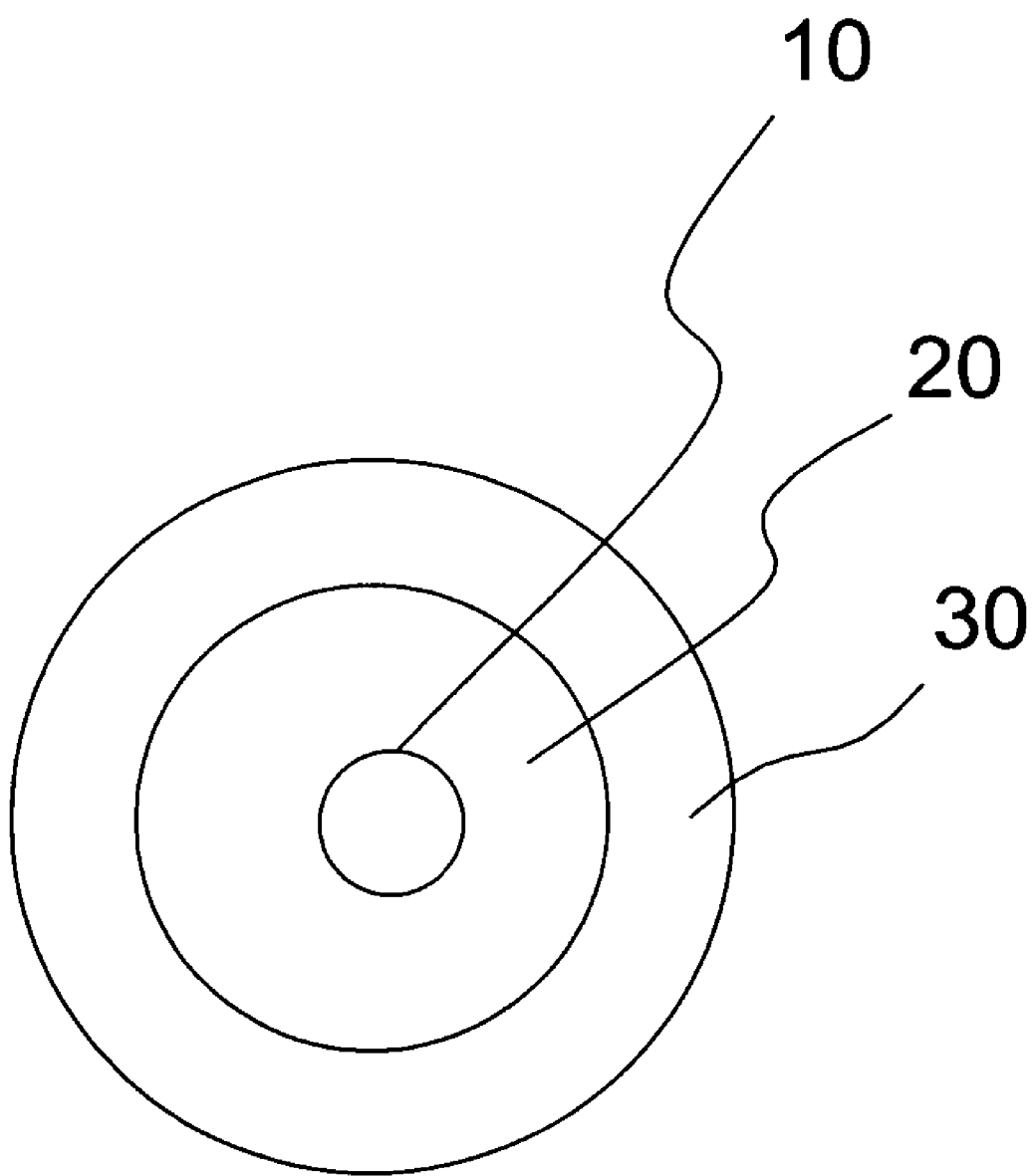
FIG. 3 is a cross-sectional view of a second preferred embodiment according to the present invention.
Figure 4A:
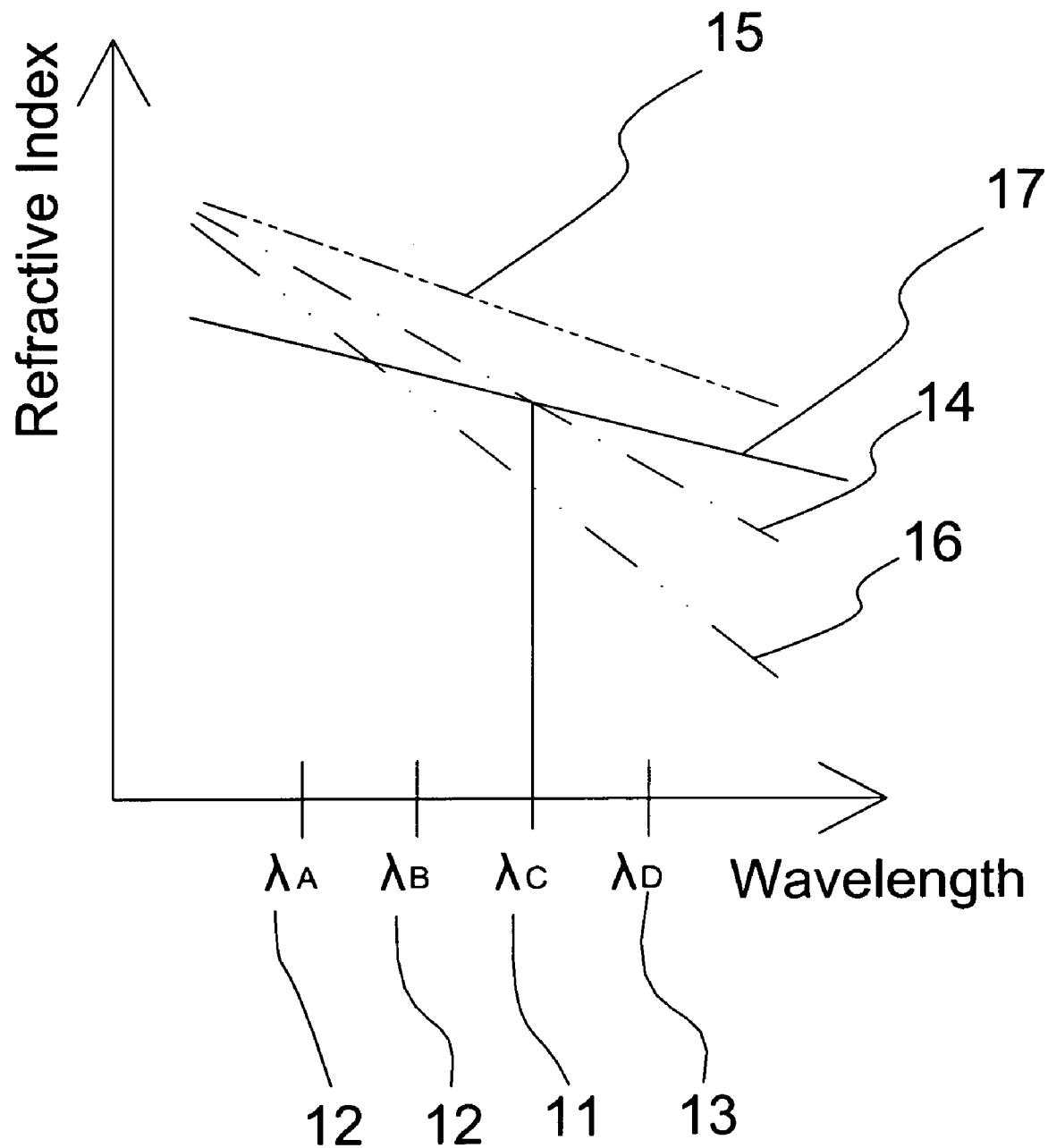
FIG. 4A is a first schematic view showing a relationship between refractive index and wavelength according to the second preferred embodiment of the present invention.
Figure 4B:
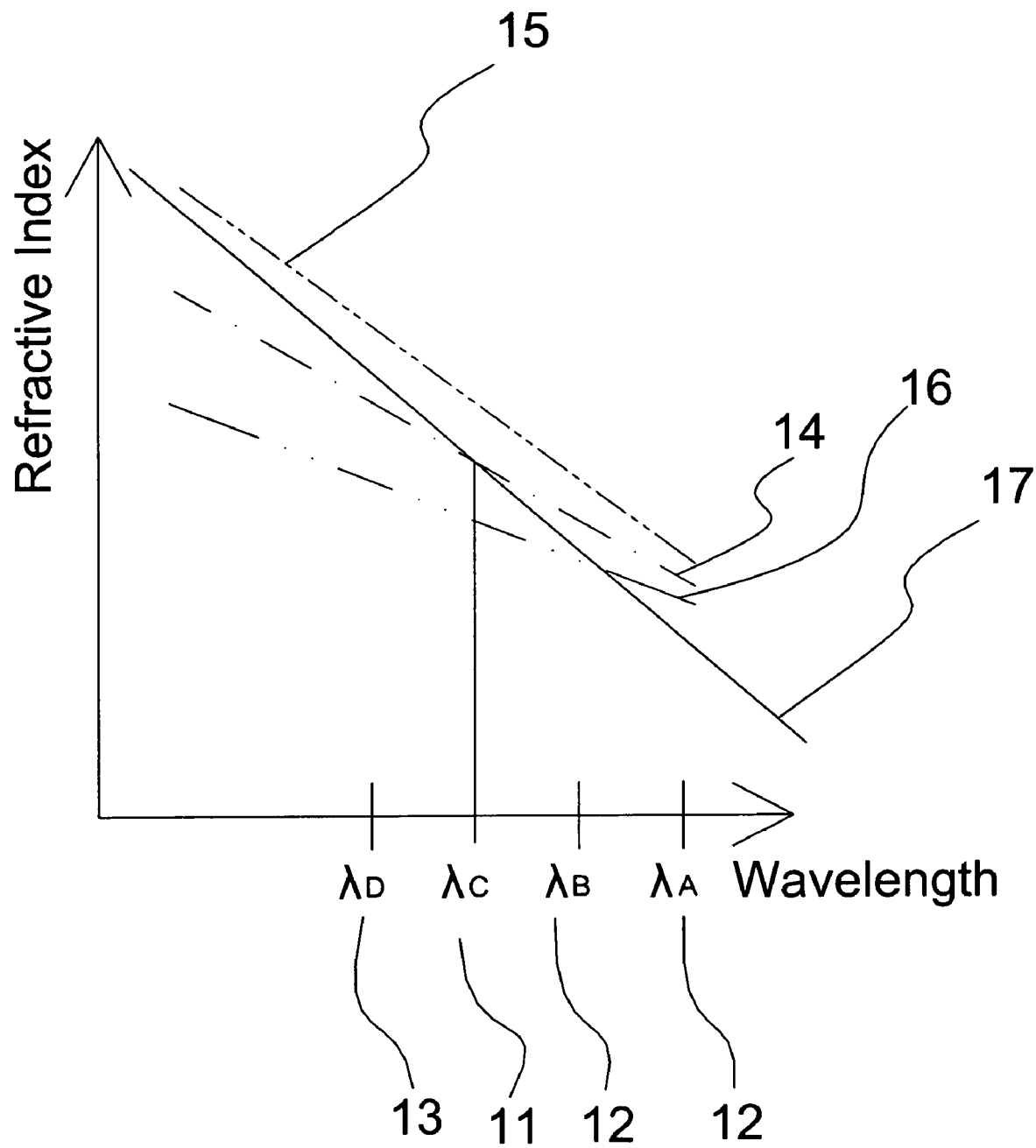
FIG. 4B is a second schematic view showing the relationship between refractive index and wavelength according to the second preferred embodiment of the present invention.
Figure 4C:
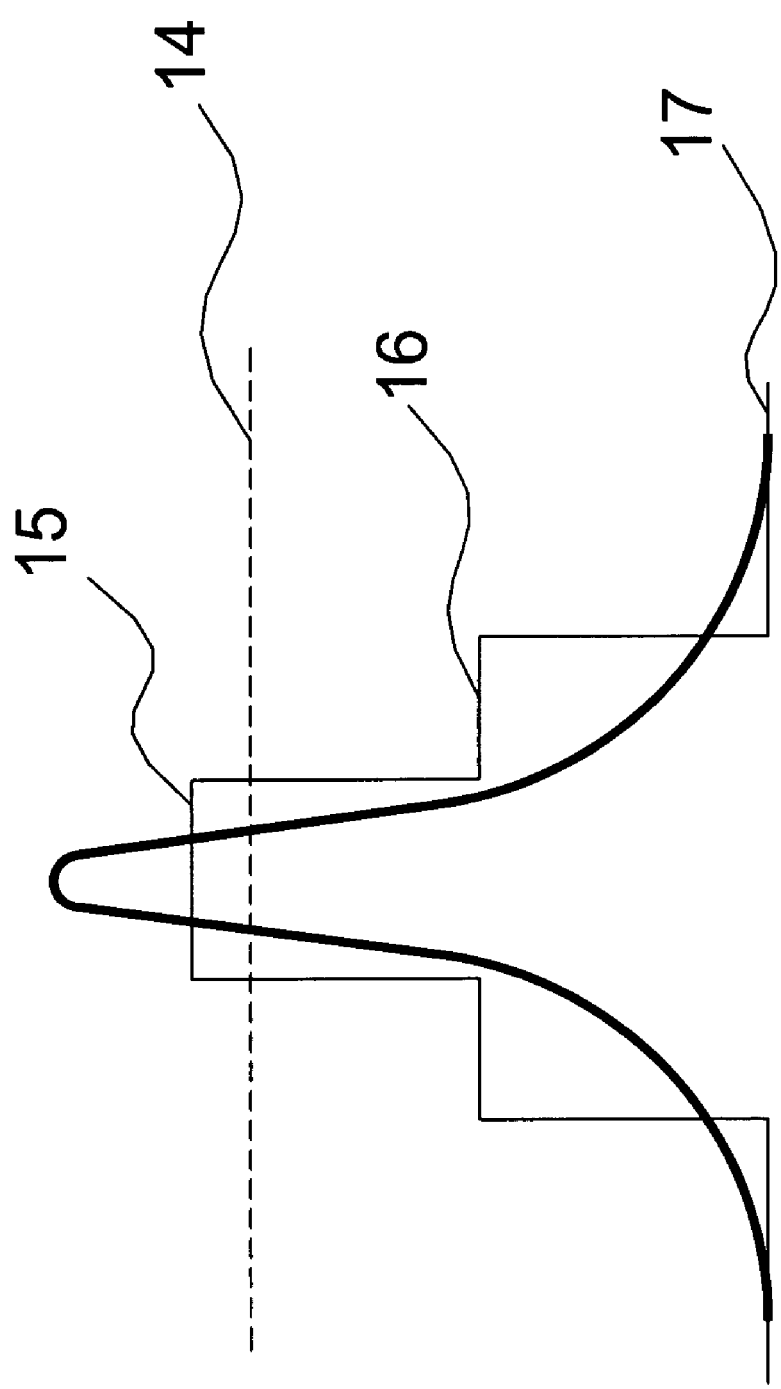
FIG. 4C is a schematic view showing a $\lambda_A$ mode field distribution of the second preferred embodiment according to the present invention.
Figure 4D:
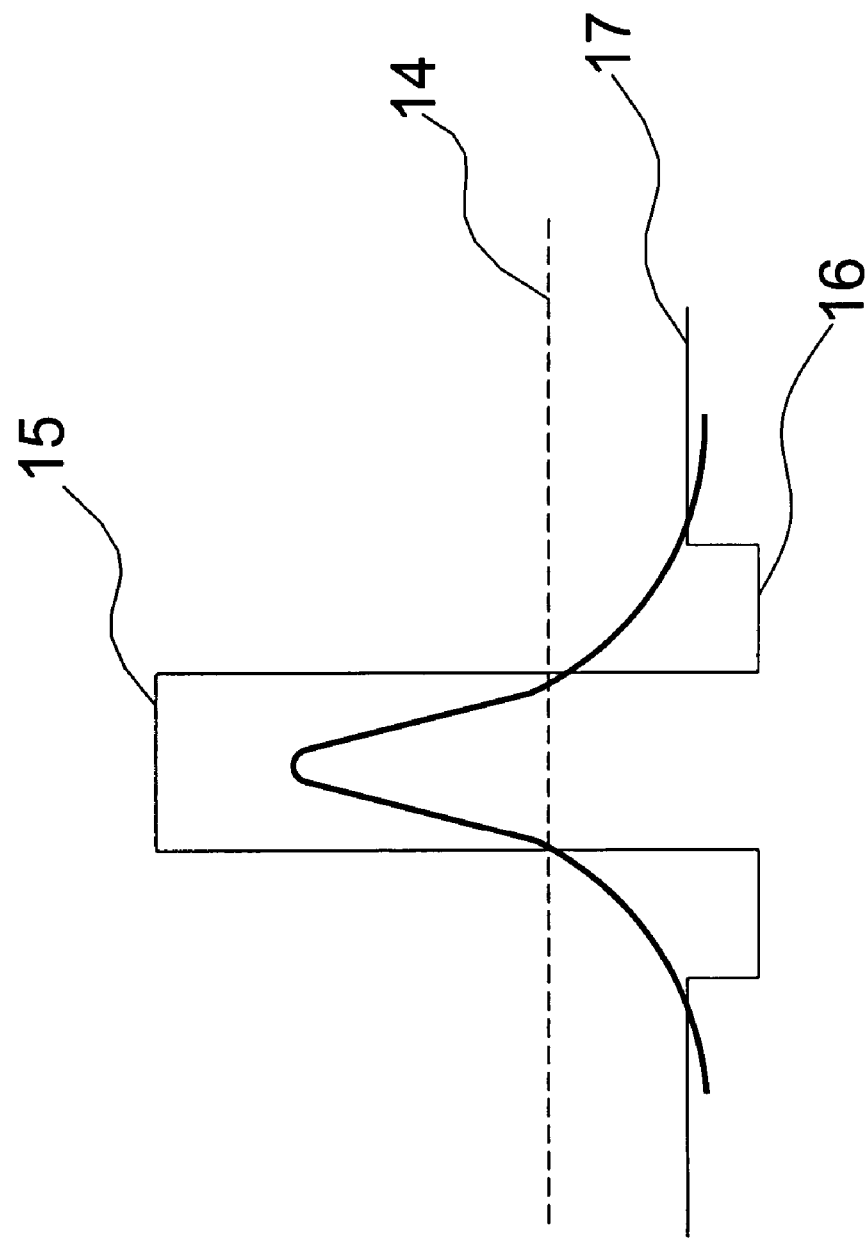
FIG. 4D is a schematic view showing a $\lambda_B$ mode field distribution of the second preferred embodiment according to the present invention.
Figure 4E:
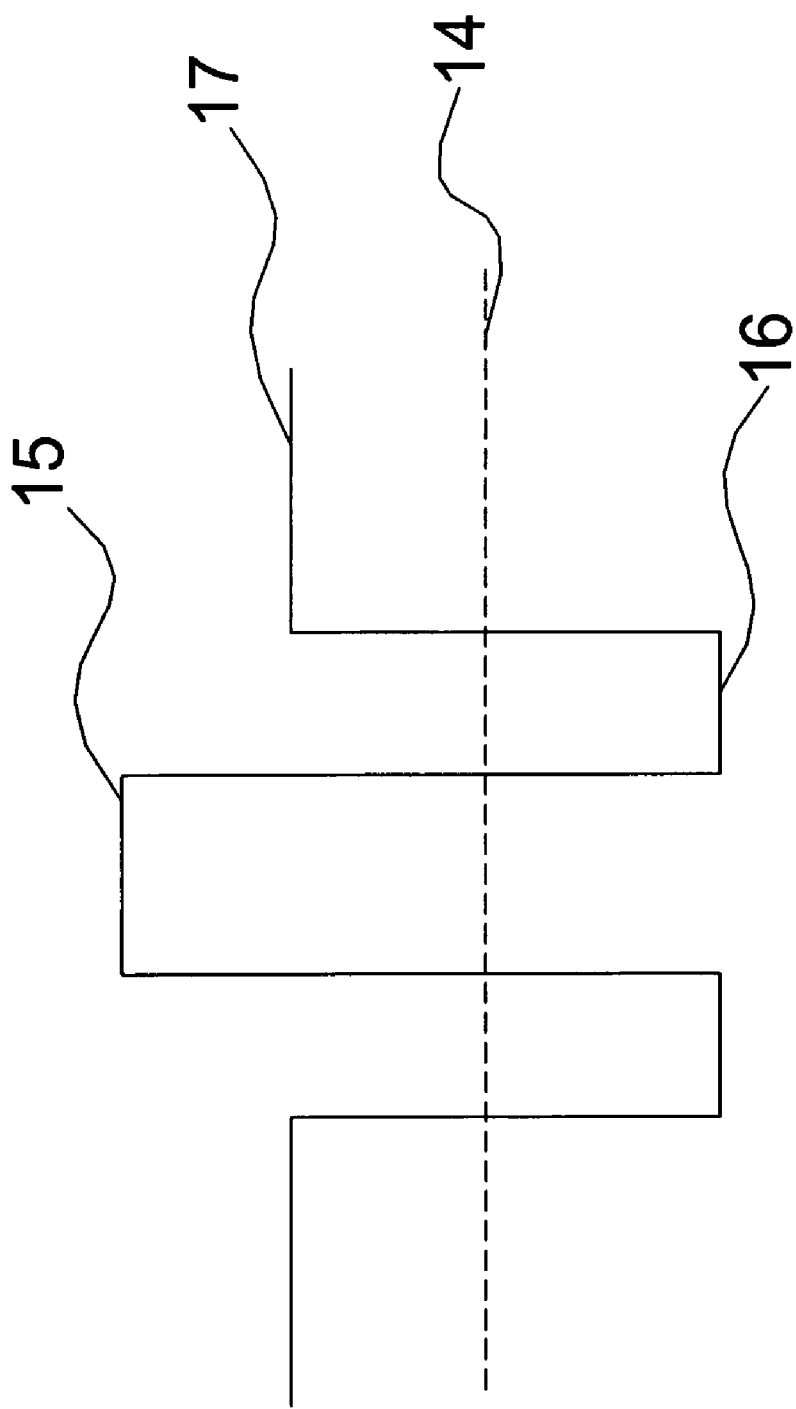
FIG. 4E is a schematic view showing a $\lambda_D$ mode field distribution of the second preferred embodiment according to the present invention.

Please refer to FIG. 3 through FIG. 4E, which is a cross-sectional view, a first and a second schematic views showing a relationship between refractive index and wavelength, and schematic views showing mode field distributions, according to a second preferred embodiment of the present invention. As shown in the figures, the present invention is a tunable fiber amplifier and laser, made of a fiber comprising a core 10, a cladding 20 and a second cladding 30, where the core 10 is surrounded with the cladding 20; the cladding 20 is surrounded with the second cladding 30; the core 10 is an optical gain medium for an electronic pumping or an optical pumping; and, the cladding 20 and the second cladding 30 are each made of an optical dispersive material of a polymer (which can be a conductive polymer), an optical absorbing material, an optical birefringent material, an optical non-linear material, a bio-material or a metal. The refractive indices of the claddings 20,30 can be changed by temperature so as to change the effective refractive index 14, where the inner cladding 20 has the function of changing a dispersion slope of the effective refractive index for the wave-guiding mode of the fiber. The second cladding 30 is made of an optical dispersive material of a polymer (which can be a conductive polymer), an optical absorbing material, an optical birefringent material, an optical non-linear material, a bio-material or a metal. When the refractive index of the second cladding 30 is changed by temperature, the intersecting point 11 obtained by the dispersion curves of the second cladding 30 and that of an effective refractive index 14 formed by the core 10 together with the cladding 20 is moved, owing to the refractive index dispersion of the cladding 20 is different from the refractive index 17 of the second cladding 30; and, so, a fundamental-mode cutoff wavelength is changed.

Figure 5:
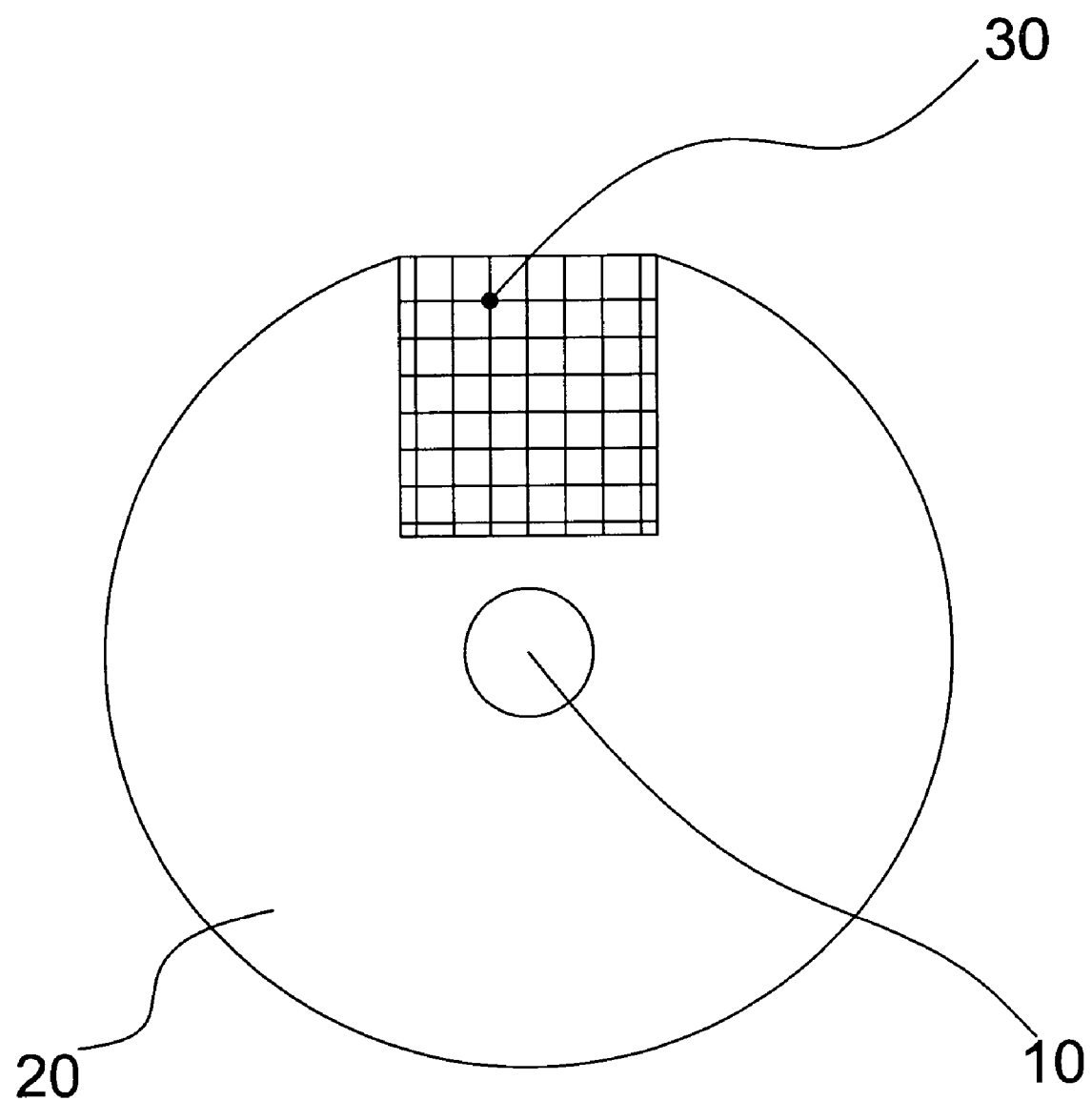
FIG. 5 is a cross-sectional view of a third preferred embodiment according to the present invention.

Please refer to FIG. 5, which is a cross-sectional view according to a third preferred embodiment of the present invention. As shown in the figures, the present invention is a tunable fiber amplifier and laser, made of a fiber comprising a core 10, a first cladding 20 and a second cladding 30, where the core 10 is an optical gain medium for an electronic pumping or an optical pumping; the core 10 is surrounded with the first cladding 20; the second cladding 30 run along with the core 10 is overlapped with the area of an evanescent field of the guiding wavelength in the core; and, the first cladding 20 is formed with an indentation for the second cladding 30 made of an optical dispersive material of a polymer, which can be an electric-conductive polymer, an optical absorbing material, an optical birefringent material, an optical non-linear material, a bio-material or a metal.

Figure 6:
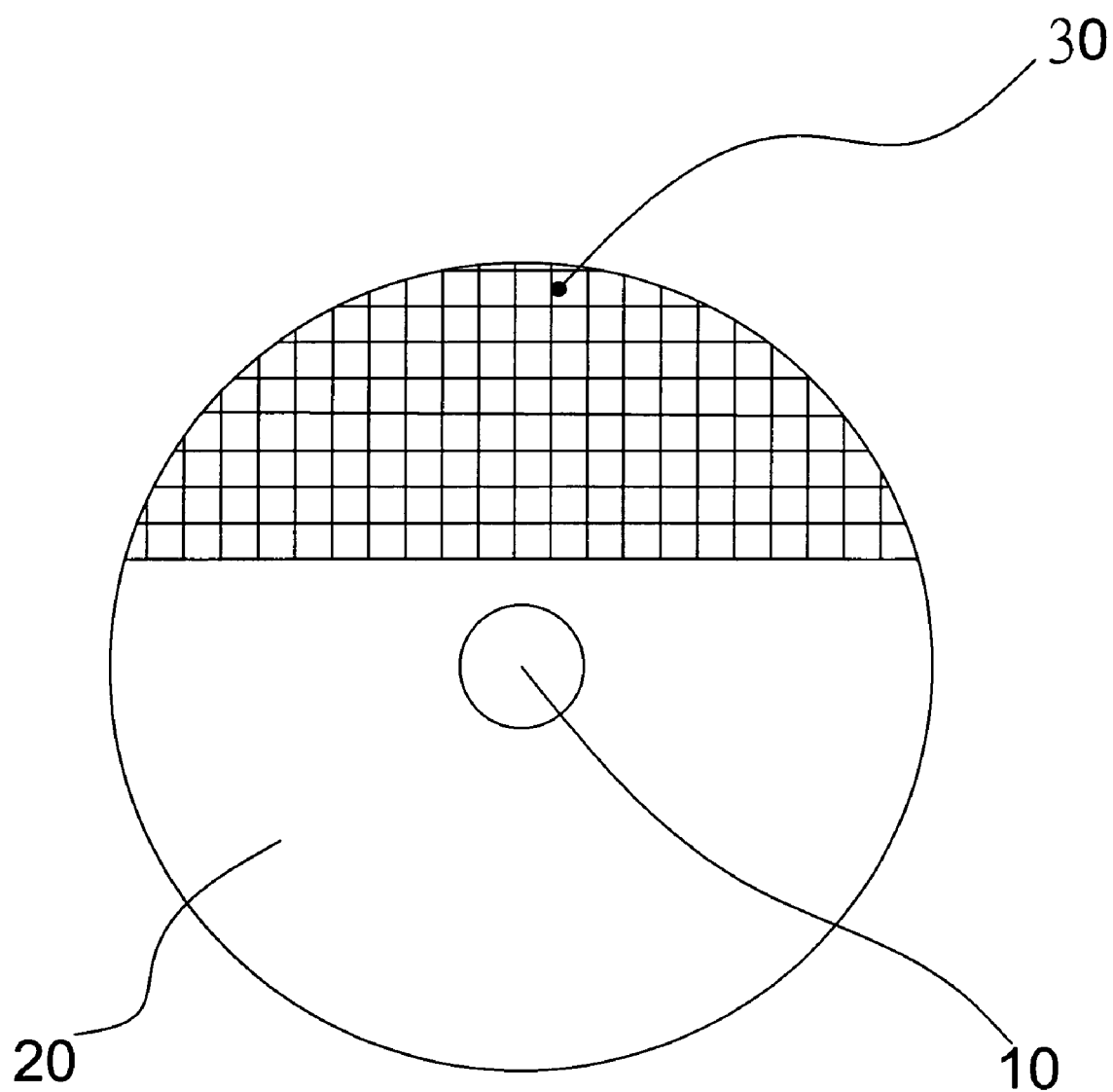
FIG. 6 is a cross-sectional view of a fourth preferred embodiment according to the present invention.

Please refer to FIG. 6, which is a cross-sectional view according to a fourth preferred embodiment of the present invention. As shown in the figures, the present invention is a tunable fiber amplifier and laser, made of a fiber comprising a core 10, a first cladding 20 and a second cladding 30. Therein, the core 10 is an optical gain medium for an electronic pumping or an optical pumping; the core 10 is surrounded with the first cladding 20; the second cladding 30 run along with the core 10 is overlapped with the area of an evanescent field of the guiding wavelength in the core; the second cladding 30 is formed at a side surface of the first cladding 20 into a solid shape of a circle segment having a chord; and, the second cladding 30 is made of an optical dispersive material of a polymer, which can be an electric-conductive polymer, an optical absorbing material, an optical birefringent material, an optical non-linear material, a bio-material or a metal.

Figure 7:
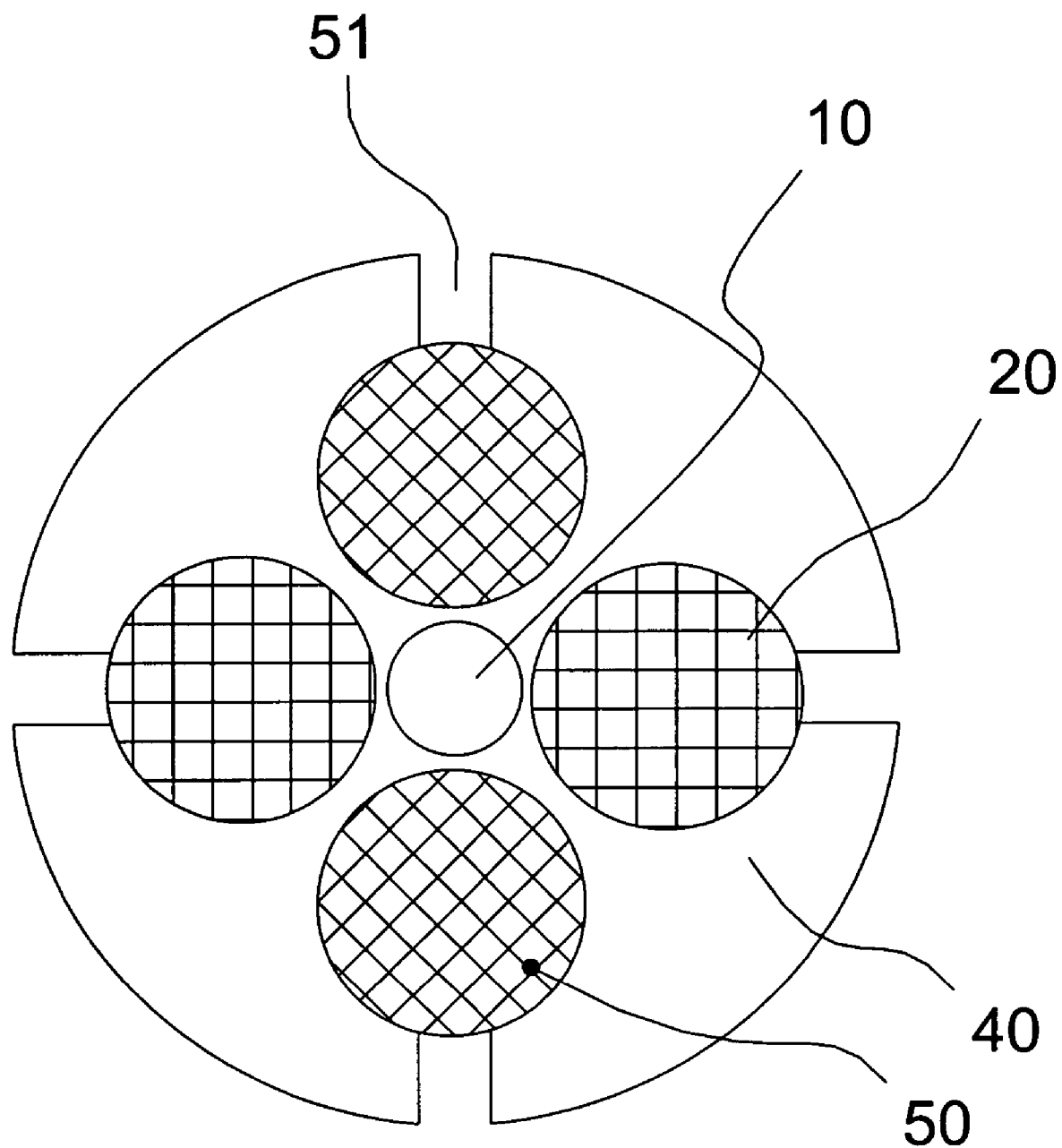
FIG. 7 is a cross-sectional view of a fifth preferred embodiment according to the present invention.

Please refer to FIG. 7, which is a cross-sectional view of a fifth preferred embodiment according to the present invention. As shown in the figure, the present invention is a tunable fiber amplifier and laser, made of a fiber comprising a core 10; at least two columns of a cladding 20 run along with the core 10; a glass material 40 covering the core 10 and the cladding 20 to obtain a base material; and a metal wire 50 burying in the cladding 20, where the cladding 20 is overlapped with the area of an evanescent field of the guiding wavelength in the core. The metal wire 50 can be heated by an electromagnetic wave to change a material dispersion of the cladding 20 and so as to change an effective refractive index 14. And, the cladding 20 can be further filled up from an opened window 51 at the outer surface. Therein, the cladding 20 can be made of an optical dispersive material of a polymer, which can be an electric-conductive polymer, an optical absorbing material, an optical birefringent material, an optical non-linear material, a bio-material or a metal.

Figure 8:
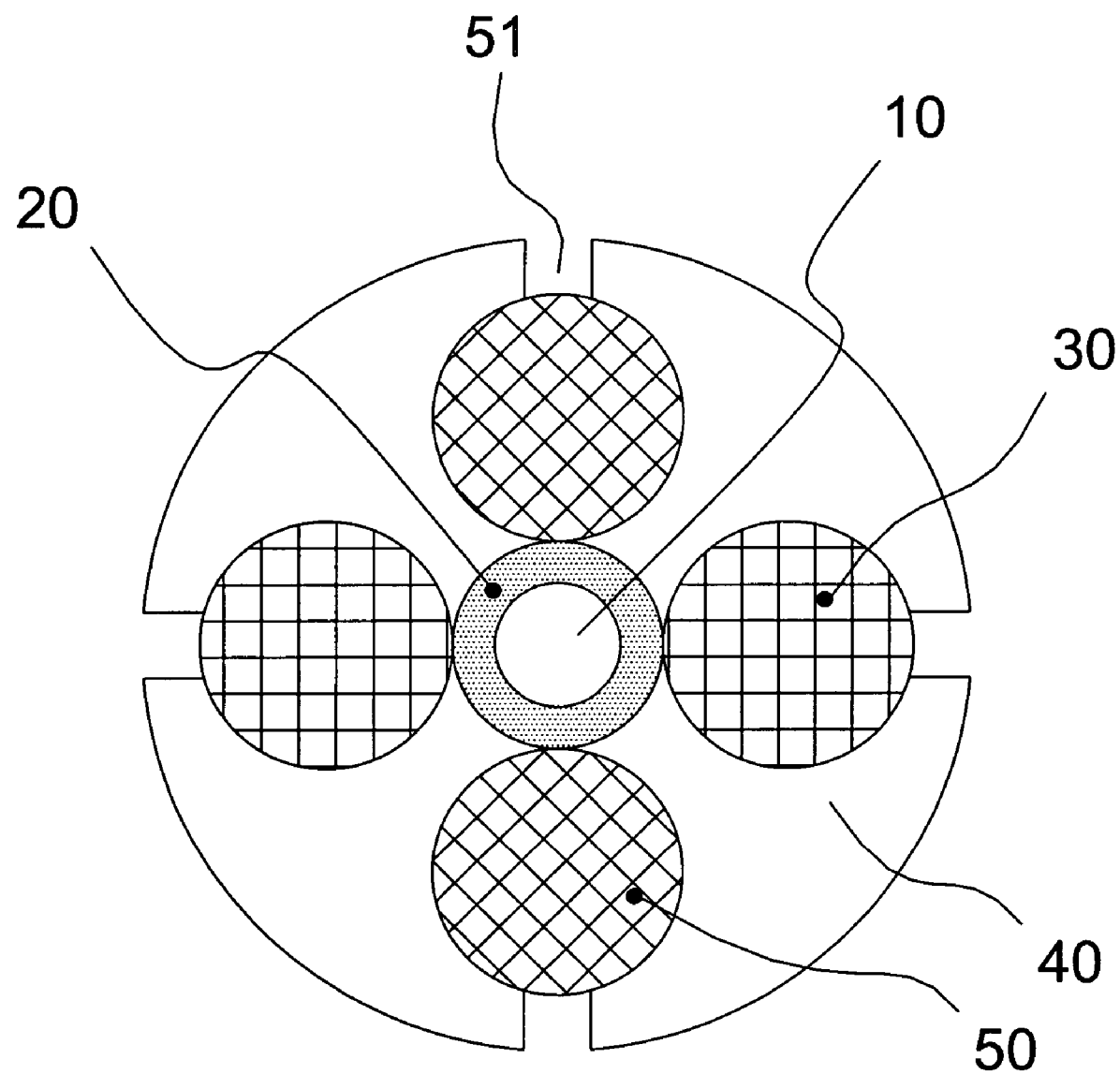
FIG. 8 is a cross-sectional view of a sixth preferred embodiment according to the present invention.

Please refer to FIG. 8, which is a cross-sectional view of a sixth preferred embodiment according to the present invention. As shown in the figure, the present invention is a tunable fiber amplifier and laser, made of a fiber comprising a core 10; a cladding 20 surrounding the core 10; at least two columns of a second cladding 30 run along with the cladding 20; a glass fiber material 40 covering the core 10 and the cladding 20 and the second cladding 30 to obtain a base material; and a metal wire 50 burying in the second cladding 30, where the second cladding 30 is overlapped with the area of an evanescent field of the guiding wavelength in the core. The metal wire 50 can be heated by an electromagnetic wave to change a refractive index 17 of the second cladding 30 and so to make a fundamental-mode cutoff wavelength tunable. And, the second cladding 30 can be further filled up from an opened window 51 at the outer surface. Therein, the purpose of the cladding 20 is to modify the dispersion slope of the effective index of the guiding wavelength in the core and the dispersion slope is crucial to the sharpness of the fundamental-mode cutoff. The cladding 20 and the second cladding 30 can be made of an optical dispersive material of a polymer, which can be an electric-conductive polymer, an optical absorbing material, an optical birefringent material, and an optical non-linear material, a bio-material or a metal.

Figure 9:
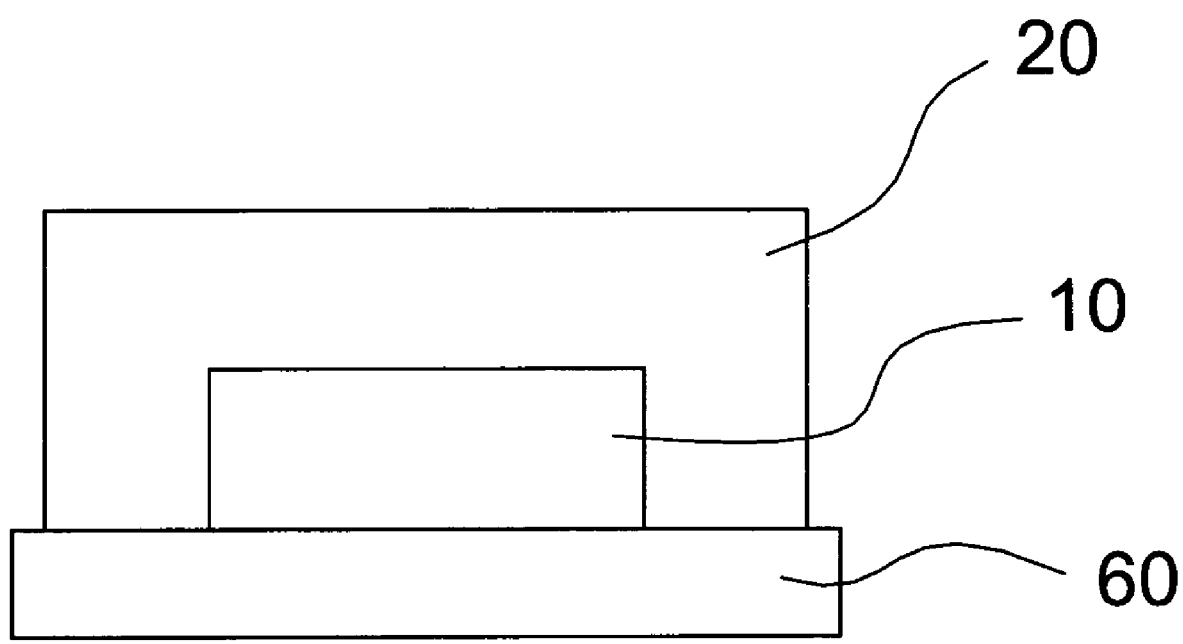
FIG. 9 is a cross-sectional view of a seventh preferred embodiment according to the present invention.
Figure 10:
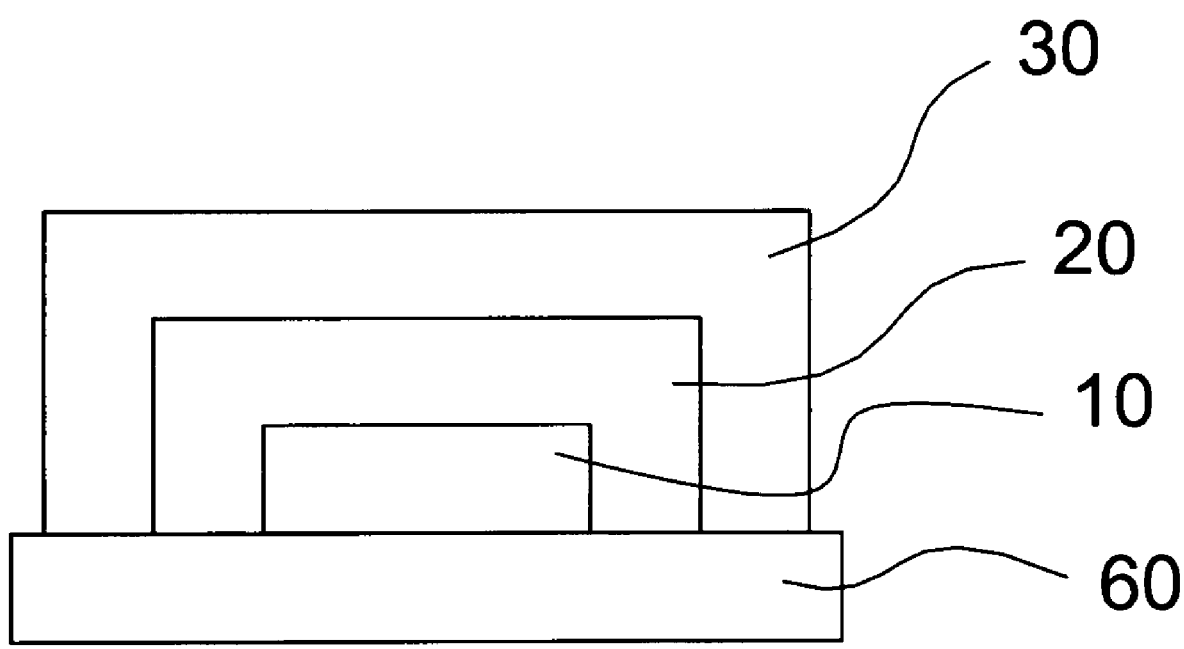
FIG. 10 is a cross-sectional view of a eighth preferred embodiment according to the present invention.

Please refer to FIG. 9 and FIG. 10, which are cross-sectional views of a seventh and a eighth preferred embodiment according to the present invention. Furthermore, the present invention can be an optical amplifier, comprising a core 10 deposed on an optical waveguide substrate 60, and a first cladding 20 covering the core 10 to change a dispersion slope of refractive index 15 of the core 10, or, together with a second cladding 30 covering the first cladding 20 to change a fundamental-mode cutoff wavelength. Therein, the first cladding 20 and the second cladding 30 can be made of an optical dispersive material of a polymer (which can be an electric-conductive polymer), an optical absorbing material, an optical birefringent material, an optical non-linear material, a bio-material or a metal.

Figure 11:
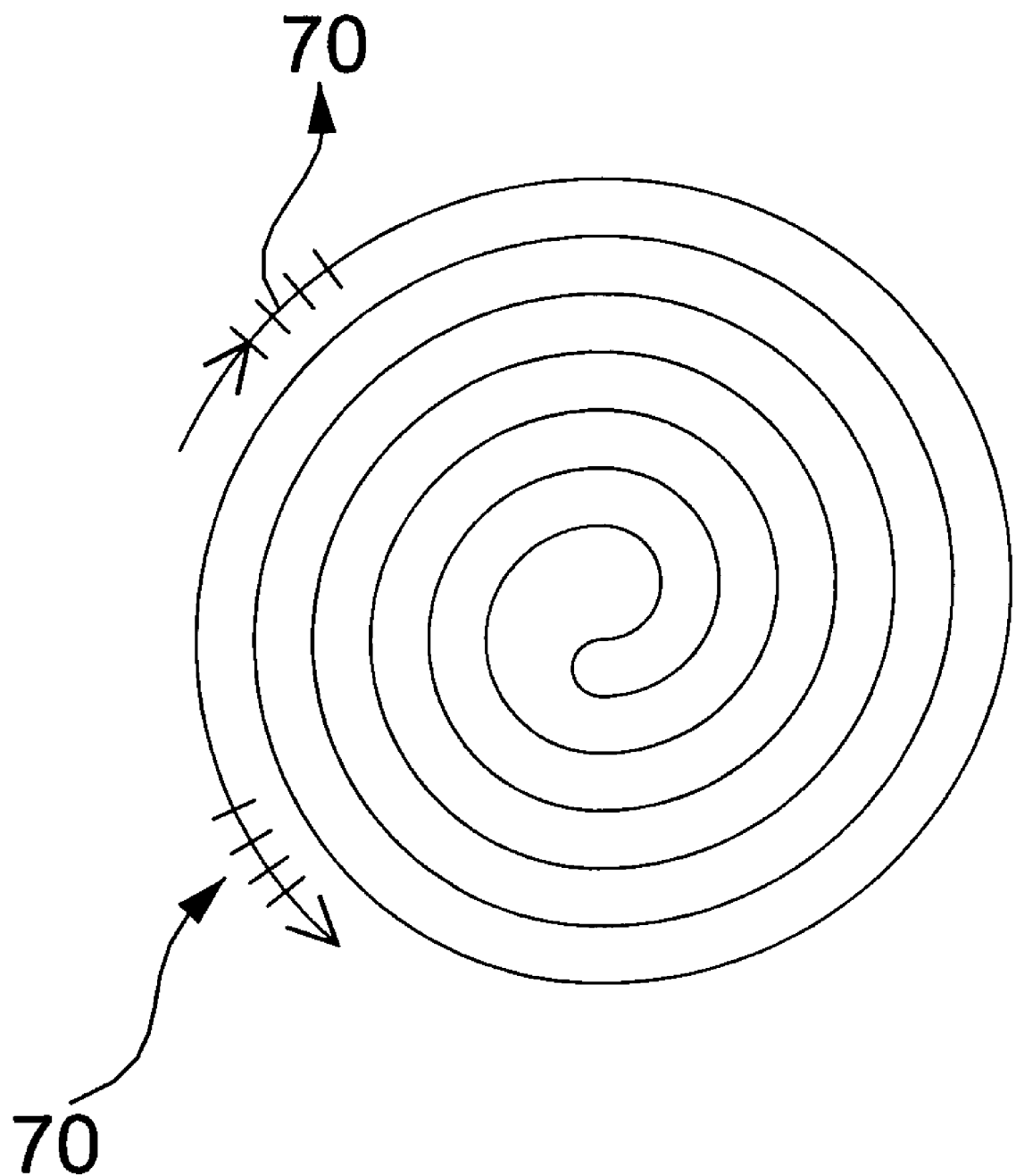
FIG. 11 is a top view of a first application according to the present invention.
Figure 12:
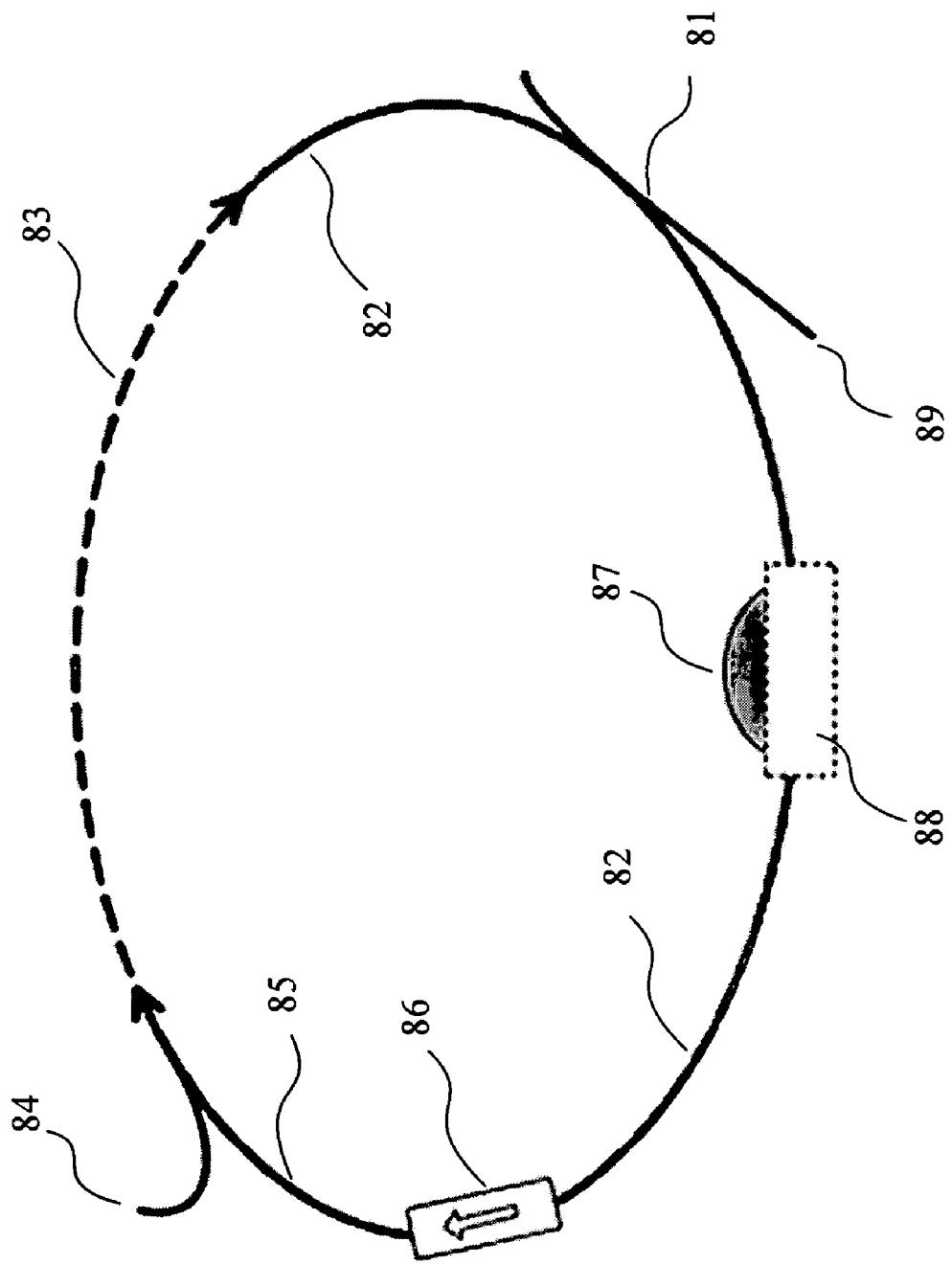
FIG. 12 is a schematic view showing a second application according to the present invention.
Figure 13:
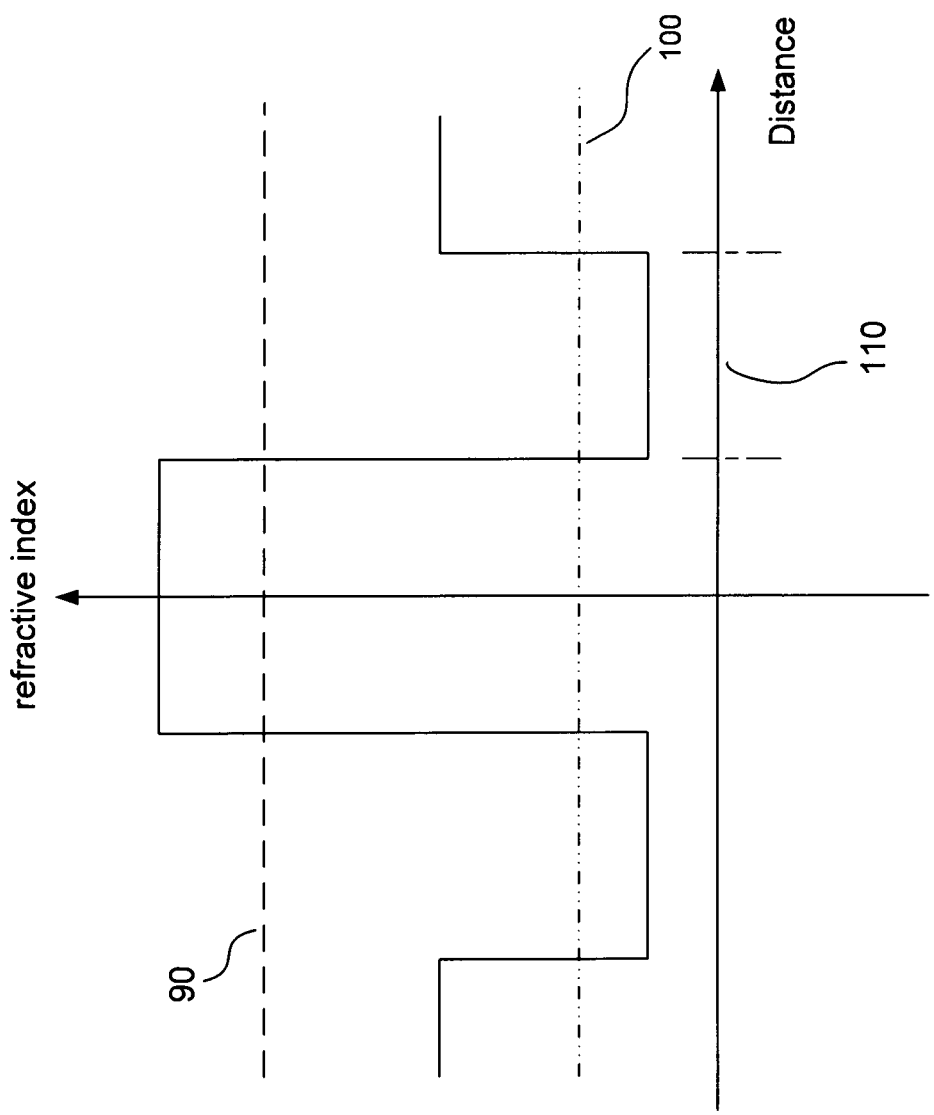
FIG. 13 is a schematic view showing a distribution of a refractive index for a double-cladding fiber of a prior art having a fundamental-mode cutoff wavelength.

Please further refer to FIG. 11, which is a top view of a first application according to the present invention. Besides, a resonance cavity, such as a grating 70, can be applied with the present invention to obtain a laser. Please refer to FIG. 12, which is a schematic view showing a second application according to the present invention. The present invention can be applied to a ring structure to obtain a tunable fiber ring laser, comprising an optical coupler 81 (9:1 tap coupler), a fiber 82 (SMF-28 Corning fiber), an Er-doped fiber 83 (20 m EDL001 POFC), a pump laser 84 (1480 nm pump laser), a wavelength division multiplexer 85 (1480/1550 WDM), an isolator 86, a dispersive polymer 87, a short-pass filter 88, and a laser output 89, where an experiment result of the tunable ring fiber laser is shown in FIG. 11.

To sum up, the present invention is a tunable fiber amplifier and laser having a simple and effective structure for a fiber where the temperature is changed to vary a material dispersion characteristics of a cladding and to simultaneously change a refractive index; and where a longer wavelength can suffer much higher rejection efficiency with in a very short fiber length than a conventional fiber whose fundamental-mode cutoff is induced based on waveguide dispersion but not the material dispersion according to the present invention.

The preferred embodiments herein disclosed are not intended to unnecessarily limit the scope of the invention. Therefore, simple modifications or variations belonging to the equivalent of the scope of the claims and the instructions disclosed herein for a patent are all within the scope of the present invention.

What is claimed is:

1. A tunable fiber amplifier and laser, made of a fiber comprising:
    (a) a core of an optical gain medium for a pumping selected from a group consisting of an electrical pumping and an optical pumping; and
    (b) at least one cladding of an optical dispersive material covering said core,
    wherein a temperature of said cladding is changed to tune a refractive index of said cladding and to further move a fundamental-mode cutoff wavelength of said fiber.

2. The fiber according to claim 1,
    wherein said cladding is deposed on a substrate as a wave guide.

3. The fiber according to claim 1,
    wherein said cladding has photonic crystal structures.

4. The fiber according to claim 1,
    wherein said core contains a resonance cavity to obtain a fiber laser.

5. The fiber according to claim 4,
    wherein said resonance cavity is selected from a group consisting of a grating and a ring structure.

6. The fiber according to claim 1,
    wherein said cladding is made of a material selected from a polymer, an optical absorbing material, an optical birefringent material, an optical non-linear material, a bio-material and a metal.

7. The fiber according to claim 6,
    wherein said polymer is selected from a group consisting of an electric-conductive polymer, a thermo-optic polymer and an electro-optic polymer.

8. The fiber according to claim 1,
    wherein said cladding is covered with a second cladding of an optical dispersive material.

9. The fiber according to claim 8,
    wherein said second cladding is made of a material selected from a polymer, an optical absorbing material, an optical birefringent material, an optical non-linear material, a bio-material and a metal.

10. The fiber according to claim 9,
    wherein said polymer is selected from a group consisting of an electric-conductive polymer, a thermo-optic polymer and an electro-optic polymer.

11. A tunable fiber amplifier and laser, made of a fiber comprising:
    (a) a core made of an optical gain medium for an pumping selected from a group consisting of an electrical pumping and an optical pumping;
    b) at least two columns of a cladding of an optical dispersive material surrounding said core;
    (c) a glass fiber material comprising said core and said cladding; and
    (d) a metal wire burying in said cladding,
    wherein a temperature of said metal wire is changed to vary a temperature of said cladding to tune a refractive index of said cladding and to further move a fundamental-mode cutoff wavelength of said fiber.

12. The fiber according to claim 11,
    wherein said glass fiber material has photonic crystal structures.

13. The fiber according to claim 11,
    wherein said core contains a resonance cavity to obtain a fiber laser.

14. The fiber according to claim 13,
    wherein said resonance cavity is selected from a group consisting of a grating and a ring structure.

15. The fiber according to claim 11,
    wherein said cladding obtains a distance from said core to be in touch with an evanescent field of a guiding wavelength.

16. The fiber according to claim 11,
    wherein said cladding is made of a material selected from a polymer, an optical absorbing material, an optical birefringent material, an optical non-linear material, a bio-material and a metal.

17. The fiber according to claim 16,
    wherein said polymer is selected from a group consisting of an electric-conductive polymer, a thermo-optic polymer and an electro-optic polymer.

18. A tunable fiber amplifier and laser, made of a fiber comprising:
    (a) a core made of an optical gain medium for a pumping selected from a group consisting of an electrical pumping and an optical pumping;
    (b) a first cladding of an optical dispersive material covering said core;
    (c) at least two columns of a second cladding of an optical dispersive material surrounding a surface of said first cladding;
    (d) a glass fiber material comprising said core and said first cladding and said second cladding; and
    (e) a metal wire burying in said second cladding,
    wherein a temperature of said metal wire is changed to vary a temperature of said second cladding to tune a refractive index of said second cladding and to further move a fundamental-mode cutoff wavelength of said fiber.

19. The fiber according to claim 18, wherein said glass fiber material has photonic crystal structures.

20. The fiber according to claim 18, wherein said core contains a resonance cavity to obtain a fiber laser.

21. The fiber according to claim 20, wherein said resonance cavity is selected from a group consisting of a grating and a ring structure.

22. The fiber according to claim 18, wherein said first cladding and said second cladding are each made of a material selected from a polymer, an optical absorbing material, an optical birefringent material, an optical non-linear material, a bio-material and a metal.

23. The fiber according to claim 22, wherein said polymer is selected from a group consisting of an electric-conductive polymer, a thermo-optic polymer and an electro-optic polymer.

* * * * *